(12) United States Patent
Wang et al.

(10) Patent No.: US 12,039,518 B2
(45) Date of Patent: Jul. 16, 2024

(54) METHOD FOR IMPLEMENTING MIDDLEWARE BASED ON EMV AND TERMINAL DEVICE

(71) Applicant: PAX COMPUTER TECHNOLOGY (SHENZHEN) CO., LTD., Guangdong (CN)

(72) Inventors: Luzhuang Wang, Guangdong (CN); Youren Chen, Guangdong (CN)

(73) Assignee: PAX COMPUTER TECHNOLOGY (SHENZHEN) CO., LTD., Guangdong (CN)

(*) Notice: Subject to any disclaimer, the term of this patent is extended or adjusted under 35 U.S.C. 154(b) by 372 days.

(21) Appl. No.: 17/791,445

(22) PCT Filed: Jul. 17, 2019

(86) PCT No.: PCT/CN2019/096285
§ 371 (c)(1),
(2) Date: Jul. 7, 2022

(87) PCT Pub. No.: WO2020/024795
PCT Pub. Date: Feb. 6, 2020

(65) Prior Publication Data
US 2023/0046119 A1    Feb. 16, 2023

(30) Foreign Application Priority Data
Aug. 1, 2018  (CN) .......................... 201810865783.3

(51) Int. Cl.
*G06Q 20/30* (2012.01)
*G06F 9/54* (2006.01)
*G06Q 20/34* (2012.01)

(52) U.S. Cl.
CPC ........... *G06Q 20/352* (2013.01); *G06F 9/541* (2013.01)

(58) Field of Classification Search
None
See application file for complete search history.

(56) References Cited

U.S. PATENT DOCUMENTS 9,892,402 B2   2/2018   Fontaine et al.
10,015,317 B1  7/2018   Crouthamel
(Continued)

FOREIGN PATENT DOCUMENTS

CN    1930592 A    3/2007
CN    102006275 A  4/2011
(Continued)

OTHER PUBLICATIONS

"A Guide to EMV Chip Technology, Nov. 2014" (Year: 2014).*
(Continued)

*Primary Examiner* — Kito R Robinson
*Assistant Examiner* — Toan Duc Bui
(74) *Attorney, Agent, or Firm* — CANTOR COLBURN LLP

(57) ABSTRACT

The present application provides a method for implementing a middleware based on EMV, a terminal device, and a computer-readable storage medium. The method includes: establishing a middleware based on EMV L2, wherein the middleware provides a first interface for an upper-layer application of the terminal device to call; after the middleware receives a calling request for the first interface sent by the upper-layer application according to detected information of a IC card, calling an interface of an Entry library according to the calling request to obtain a return result of the Entry library, wherein the return result of the Entry library comprises an application identifier of the IC card; and determining an EMV L2 library matching the IC card based on the application identifier, and calling an interface (Continued)

of the EMV L2 library matching the IC card, to complete a contactless process with the IC card.

9 Claims, 4 Drawing Sheets

(56) References Cited

U.S. PATENT DOCUMENTS

| | | | |
|---|---|---|---|
| 2006/0287964 | A1 | 12/2006 | Brown |
| 2018/0012213 | A1* | 1/2018 | Adelgren ........... G06Q 20/3823 |
| 2018/0081682 | A1 | 3/2018 | Ren et al. |

FOREIGN PATENT DOCUMENTS

| | | |
|---|---|---|
| CN | 102842193 A | 12/2012 |
| CN | 104145285 A | 11/2014 |
| CN | 104348951 A | 2/2015 |
| CN | 106250113 A | 12/2016 |
| CN | 109240655 A | 1/2019 |

OTHER PUBLICATIONS

"EMV Card Personalization Specification, Jun. 2003" (Year: 2003).*
"How to build a simple smart card emulator & reader for Android, Hamdaoui, Nov. 20, 2017" (Year: 2017).*
"Demystifying EMV card technology, Patrick Mutabazi, Aug. 29, 2017" (Year: 2017).*
"EMV Middleware Slows Processing Speeds, Christina Lavingia, Nov. 22, 2016" (Year: 2016).*
Android Bundle. Retrieved Mar. 18, 2022 from Internet URL https://developer.android.com/reference/android/os/Bundle. Machine Translation Included. 64 Pages.
Ceipidor, U. et al. "A Protocol for mutual authentication between NFC phones and POS terminals for secure payment transactions", 2019 9th International ISC Conference on Information Security and Cryptology, 6 Pages.
East Net Technology Big Coffee takes you into the internal and external chip card labeling: EmV and PBOC comparison. Mar. 27, 2017. Machine Translation Included. 7 Pages.
English Translation for Written Opinion for International Application No. PCT/CN2019/096285; Date of Completion: Oct. 10, 2019; dated Oct. 14, 2019; 5 Pages.
International Prelimininary Report on Patentability International Application No. PCT/CN2019/096285 dated Feb. 2, 2021; 5 pages.
International Search Report for International Application No. PCT/CN2019/096285; Date of Completion: Sep. 18, 2019; dated Nov. 1, 2019; 4 pages.
Translation of International Search Report for International Application No. PCT/CN2019/096285; Date of Completion: Sep. 18, 2019; dated Nov. 1, 2019; 2 pages.
Written Opinion for International Application No. PCT/CN2019/096285; Date of Completion: Oct. 10, 2019; dated Oct. 14, 2019; 4 Pages.
Yu, Y. et al. "Design and Realization of an Internet Ondividual Payment Terminal", 2017 Yunnan Natian Electronics Information Co., Ltd., 4 Pages.

* cited by examiner

METHOD FOR IMPLEMENTING MIDDLEWARE BASED ON EMV AND TERMINAL DEVICE

CROSS REFERENCE TO RELATED APPLICATIONS

The present application is a National phase of international patent application No. PCT/CN2019/096285 with an international filling date of Jul. 17, 2019, designating the USA, now pending, and further claims priority of Chinese Patent Application, with Application No. 201810865783.8, filed on Aug. 1, 2018, the contents of all of the aforementioned application, including any intervening amendments thereto, are incorporated herein by reference.

TECHNICAL FIELD

The present application relates to the field of communication technology, and more particularly to a method for implementing a middleware based on EMV, a terminal device, and a computer-readable storage medium.

BACKGROUND

The EMV standard is a technical standard for the transfer of bank cards from magnetic stripe cards to smart integrated circuit (IC) cards jointly initiated and formulated by the three major international bank card organizations, Europay, MasterCard and Visa. It is a financial payment standard based on IC cards, and has become a recognized global standard.

The EMV L2 contactless specification is derived from the EMV standard, but each card organization has made some personalized transformations to form its own specifications, such as: Qpboc of the UnionPay, Paywave of the Visa, MCL of the Master Card, Daps of the Discover, AE of the Express and so on. In this way, there will be differences in the Application Programming Interface (API) of different contactless EMV L2 libraries, and there will be differences in the interaction process, which will lead to the problem of time-consuming and inconvenient maintenance for application development to support the EMV process of multiple card organizations.

Technical Problem

In view of this, the embodiments of the present application provide a method for implementing a middleware based on EMV, a terminal device, and a computer-readable storage medium, to solve the problem of long development cycle and inconvenient maintenance of the current application development cycle of EMV process that supports multiple card organizations.

SUMMARY

A first aspect of an embodiment of the present application provides a method for implementing a middleware based on EMV, applied to a terminal device, and the method including:

establishing a middleware based on EMV L2, wherein the middleware provides a first interface for an upper-layer application of the terminal device to call;

after the middleware receives a calling request for the first interface sent by the upper-layer application according to detected information of a IC card, calling an interface of an Entry library according to the calling request to obtain a return result of the Entry library, wherein the return result of the Entry library comprises an application identifier of the IC card; and determining an EMV L2 library matching the IC card based on the application identifier, and calling an interface of the EMV L2 library matching the IC card, to complete a contactless process with the IC card.

A second aspect of an embodiment of the present application provides a terminal device, which includes:

a middleware establishing module, configured for establishing a middleware based on EMV L2, wherein the middleware provides a first interface for an upper-layer application of the terminal device to call;

an application identifier acquisition module, configured for after the middleware receives a calling request for the first interface sent by the upper-layer application according to detected information of a IC card, calling an interface of an Entry library according to the calling request to obtain a return result of the Entry library, wherein the return result of the Entry library comprises an application identifier of the IC card; and a processing module, configured for determining an EMV L2 library matching the IC card based on the application identifier, and calling an interface of the EMV L2 library matching the IC card, to complete a contactless process with the IC card.

A third aspect of an embodiment of the present application provides a terminal device, which includes a memory, a processor and a computer program stored in the memory and running on the processor, wherein the processor executes the computer program to implement steps of the method in embodiments of the first aspect of the present application.

A fourth aspect of an embodiment of the present application provides a computer-readable storage medium storing a computer program, and the computer program is executed by one or more processors to implement steps of the method in embodiments of the first aspect of the present application.

A fifth aspect of an embodiment of the present application provides a computer program product, the computer program product includes a computer program, and when the computer program is executed by one or more processors, implements steps of the method in embodiments of the first aspect of the present application.

BENEFIT EFFECT

An embodiment of the present application provides a method for implementing middleware, which is applied in the EMV standard. In the method, firstly establishing a middleware based on EMV L2, and the middleware provides a first interface for an upper-layer application of the terminal device to call, after the middleware receives a calling request for the first interface sent by the upper-layer application according to detected information of a IC card, calling an interface of an Entry library according to the calling request to obtain a return result of the Entry library, wherein the return result of the Entry library comprises an application identifier of the IC card; and determining an EMV L2 library matching the IC card based on the application identifier, and calling an interface of the EMV L2 library matching the IC card, to complete a contactless process with the IC card; since the middleware established in the present application can provide a unified first interface for the upper-layer application of the terminal device to call, and after the middleware receives the call request from the upper-layer application through the first interface, the application identifier of the IC card currently processed by the upper-layer application can be obtained, and the interface of the EMV L2 library matching the IC card can be called according to the application identifier of the IC card, and the contactless process with the IC card can be completed. In this way, when developing applications that support the EMV processes of multiple card organizations, it is not necessary to consider the differences in the EMV processes of different card organizations, but to shield these differences through middleware, thereby shortening the development cycle, and it does not take into account the differences in the EMV process of different card organizations and facilitates later maintenance.

BRIEF DESCRIPTION OF THE DRAWINGS

In order to illustrate the technical solutions in the embodiments of the present application more clearly, the following briefly introduces the accompanying drawings that need to be used in the description of the embodiments or the prior art. Obviously, the drawings in the following description are only for the present application. In some embodiments, for those skilled in the art, other drawings can also be obtained according to these drawings without any creative effort.

DETAILED DESCRIPTION

In the following description, for the purpose of illustration rather than limitation, specific details such as a specific system structure and technology are set forth in order to provide a thorough understanding of the embodiments of the present application. However, it will be apparent to those skilled in the art that the present application may be practiced in other embodiments without these specific details. In other instances, detailed descriptions of well-known systems, devices, circuits, and methods are omitted so as not to obscure the description of the present application with unnecessary detail.

It is to be understood that, when used in the present specification and the appended claims, the term "comprising" indicates the presence of the described feature, integer, step, operation, element and/or component, but does not exclude one or more other features, whole, step, operation, element, component and/or the presence or addition of a set thereof.

It should also be understood that the terminology used in the specification of the application herein is for the purpose of describing particular embodiments only and is not intended to limit the present application. As used in the present specification and the appended claims, the singular forms "a," "an," and "the" are intended to include the plural unless the context clearly dictates otherwise.

It should also be further understood that, as used in the present specification and the appended claims, the term "and/or" refers to and including any and all possible combinations of one or more of the associated listed items.

As used in the present specification and the appended claims, the term "if" may be contextually interpreted as "when" or "once" or "in response to determining" or "in response to detecting". Similarly, the phrases "if determining" or "if detecting the [described condition or event]" may be interpreted, depending on the context, to mean "once it is determined" or "in response to detecting" or "once detecting the [described condition or event]" or "in response to detecting the [described condition or event]".

In order to illustrate the technical solutions described in the present application, the following specific embodiments are used for description.

Figure 1:
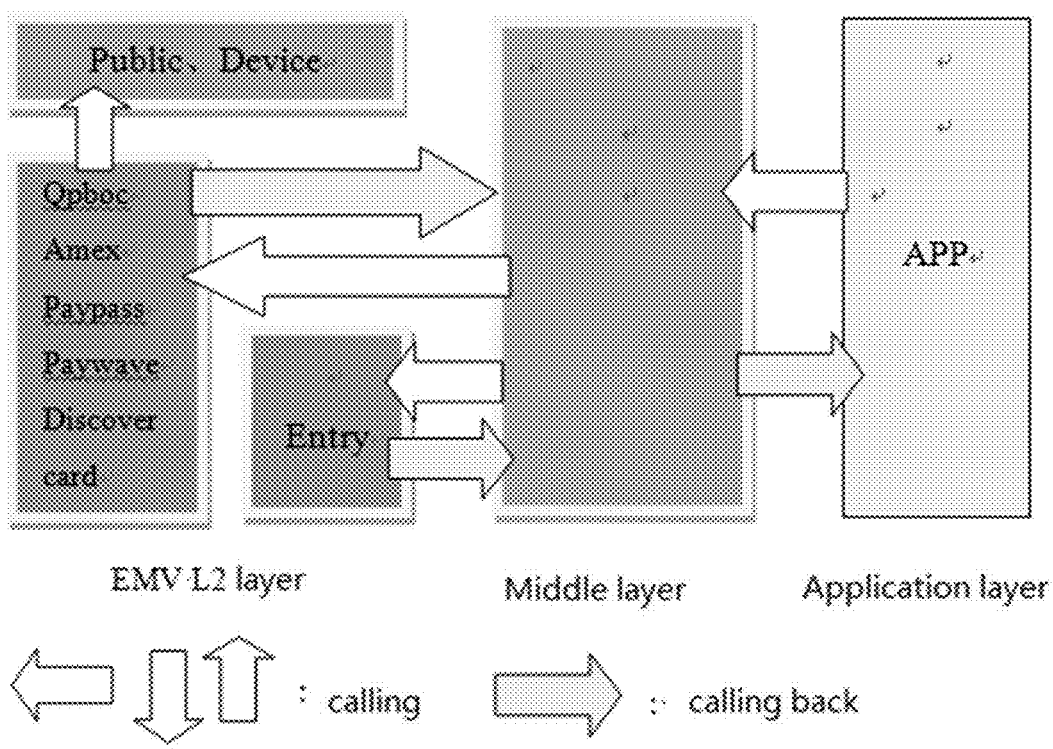
FIG. 1 is a system architecture diagram provided by an embodiment of the present application.

First, the system architecture applied by the embodiments of the present application is introduced. FIG. 1 is a system architecture diagram provided by the embodiments of the present application. As shown in the figure, the system architecture diagram provided by the embodiments of the present application includes three layers: an application layer, a middle layer, an EMV L2 layer.

Among them, the application software (APP) in the application layer prompts the user to swipe or insert the card (bank card, etc.) in the business process. When the application layer detects the card, it can call the interface provided by the middle layer to complete the interactive process with the bank card, in the interactive process, the obtained processing results and related data are used to upload the background to complete the transaction.

The middle layer can shield the difference between the contactless libraries in the EMV L2 layer, and provide a unified interface for application calls in the application layer. The middle layer will call the specific EMV L2 interface according to the process and needs.

The EMV L2 layer includes the contactless entry library (the entry defined by EMV), the contactless library corresponding to each card organization specification, and the auxiliary tool library.

As shown in the figure, the EMV L2 layer includes multiple contactless libraries of card organization specifications:
  QPBOC, a fast debit/credit contactless payment application card launched in China, compliant with PBOC specifications;
  Amex, a credit card specification launched by American Express;
  Paypass, a wireless payment technology launched by MasterCard International in 2003;
  Paywave, a contactless payment method launched by VISA card on the basis of EMV;
  Discover Card, a specification supported by the Discover Card issued by the American Discover credit card issuer.

The EMV L2 layer also includes auxiliary tool libraries, such as public tools (Public), supported hardware devices (Device), etc.

It should be noted that the card organization specification or the tool library etc. appearing in FIG. 1 are only used for example, and are not used to limit the present application.

Figure 2:
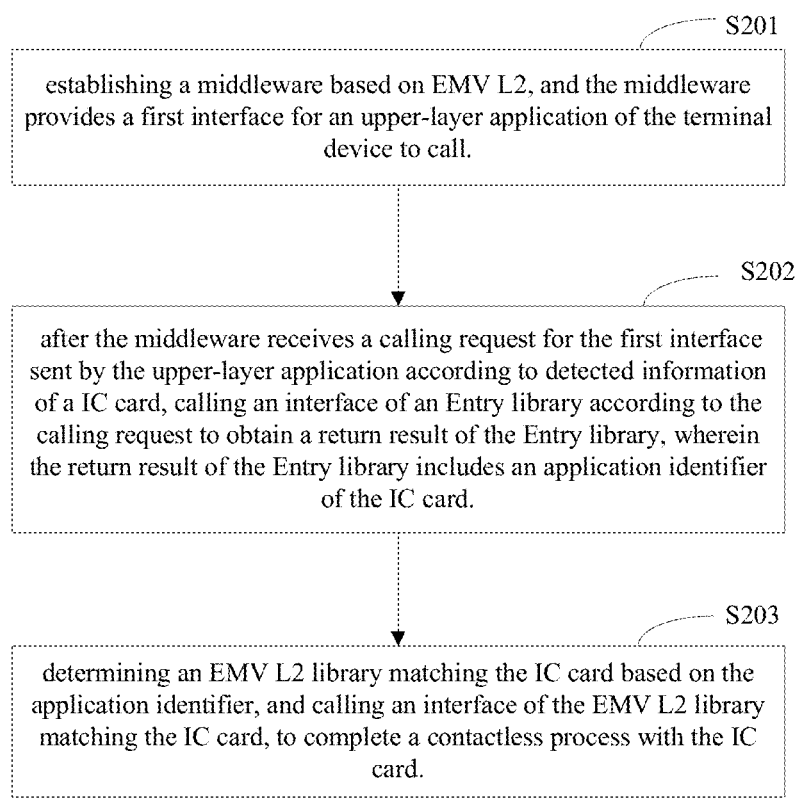
FIG. 2 is a schematic flowchart of a method for implementing a middleware based on EMV provided by an embodiment of the present application.

FIG. 2 is a schematic diagram of an implementation flow of a method for implementing a middleware based on EMV provided by an embodiment of the present application. As shown in the figure, the method may include the following steps:

Step S201: establishing a middleware based on EMV L2, and the middleware provides a first interface for an upper-layer application of the terminal device to call.

In the embodiment of the present application, if there is no middleware in the embodiment of the present application, in order to ensure that the upper-layer application can support a variety of bank cards, there may be a situation in which the interfaces of multiple card organization specifications (EMV L2) are called, then the upper-layer application also needs to be developed based on the API provided by the EMV L2 library, and the APIs of different contactless EMV L2 libraries are different, and the interaction processes are also different, which leads to problems such as time-consuming, error-prone, and bloated and cluttered final software code, which is inconvenient for maintenance, when the upper-layer application develops an EMV process that supports multiple card organizations. Therefore, the present application provides a middleware based on the EMV L2, which can provide a first interface for the upper-layer application of the terminal device to call. The first interface is a unified interface, and the upper-layer application can be called. Then the upper-layer application does not need to provide different processes for different contactless EMV L2 library APIs when developing.

Step S202: after the middleware receives a calling request for the first interface sent by the upper-layer application according to detected information of a IC card, calling an interface of an Entry library according to the calling request to obtain a return result of the Entry library, wherein the return result of the Entry library includes an application identifier of the IC card.

In the embodiment of the present application, the IC card may be an integrated circuit card, also known as a smart card or a chip card, and generally refers to a bank card during transactions.

As an application scenario of the embodiment of the present application, when a user needs to pay for shopping in a shopping mall or supermarket, the cashier system in the shopping mall or supermarket will generate relevant information about the transaction and prompt the user to insert or swipe the card. The user or the cashier can insert the bank card used for payment into the payment device, or paste the bank card on the payment device. After the payment device detects the signal of the bank card, the upper-layer application will generate a call request according to the information of the current transaction, to call the first interface provided by the middleware, after receiving the calling request, the middleware calls the interface of the Entry library in the EMV L2 layer according to the calling request, and the Entry library interacts with the bank card to obtain the application identifier (AID) of the bank card, and the application identifier is matched with the pre-stored supported application identifier; if the matching is successful, the application identifier of the IC card is returned to the middleware.

Step S203: determining an EMV L2 library matching the IC card based on the application identifier, and calling an interface of the EMV L2 library matching the IC card, to complete a contactless process with the IC card.

In the embodiment of the present application, after receiving the application identifier of the IC card returned by the entry library, the middleware can determine the EMV L2 library matching the IC card according to the application identifier of the IC card, and then call the interface of the EMV L2 library that matches the IC card, and complete the contactless process with the IC card.

Since the middleware established in the present application can provide a unified first interface for the upper-layer application of the terminal device to call, and after the middleware receives the call request from the upper-layer application through the first interface, the application identifier of the IC card currently processed by the upper-layer application can be obtained, and the interface of the EMV L2 library matching the IC card can be called according to the application identifier of the IC card, and the contactless process with the IC card can be completed. In this way, when developing applications that support the EMV processes of multiple card organizations, it is not necessary to consider the differences in the EMV processes of different card organizations, but to shield these differences through middleware, thereby shortening the development cycle, and it does not take into account the differences in the EMV process of different card organizations and facilitates later maintenance.

Figure 3:
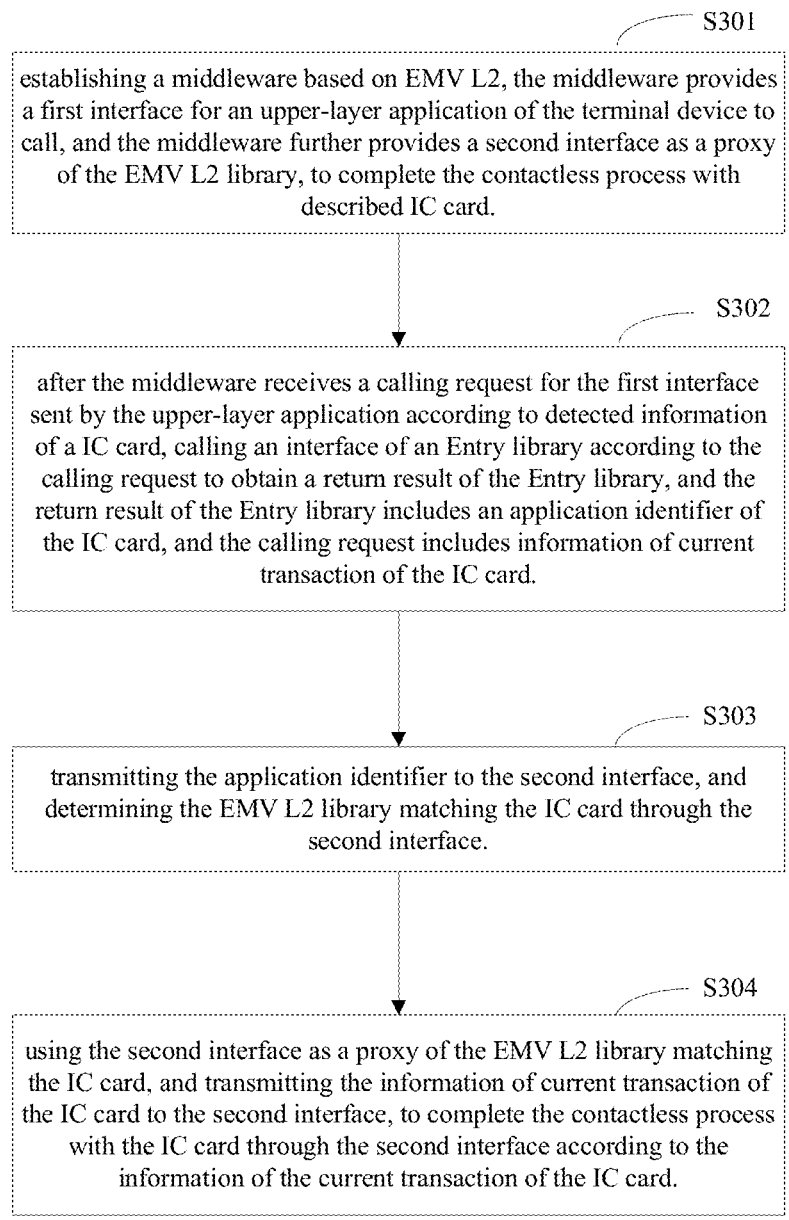
FIG. 3 is a schematic flowchart of another method for implementing a middleware based on EMV provided by an embodiment of the present application.

FIG. 3 is a schematic diagram of an implementation flow of another method for implementing a middleware based on EMV provided by an embodiment of the present application. As shown in the figure, the method may include the following steps:

Step S301: establishing a middleware based on EMV L2, the middleware provides a first interface for an upper-layer application of the terminal device to call, and the middleware further provides a second interface as a proxy of the EMV L2 library, to complete the contactless process with described IC card.

In the embodiment of the present application, the middleware not only provides a first interface for upper-layer applications to call, but also provides a second interface as a proxy of the EMV L2 library, which shields the differences between the interfaces of different EMV L2 libraries, and is responsible for completing the contactless process of the bank card organization with the interface organization of the specific EMV L2 library.

Step S302: after the middleware receives a calling request for the first interface sent by the upper-layer application according to detected information of a IC card, calling an interface of an Entry library according to the calling request to obtain a return result of the Entry library, and the return result of the Entry library includes an application identifier of the IC card, and the calling request includes information of current transaction of the IC card.

In the embodiment of the present application, when the upper-layer application sends a calling request of the first interface to the middleware, which can send the information of the current transaction of the bank card to the middleware together.

Step S303: transmitting the application identifier to the second interface, and determining the EMV L2 library matching the IC card through the second interface.

In the embodiment of the present application, since the second interface provided by the middleware can be used as the proxy of the EMV L2 library, the application identifier of the bank card can be transmitted to the second interface, and the EMV L2 library matching with the IC card can be determined through the second interface, the second interface may be a LoadData method, through which the application identifier is transmitted in.

Step S304: using the second interface as a proxy of the EMV L2 library matching the IC card, and transmitting the information of current transaction of the IC card to the second interface, to complete the contactless process with the IC card through the second interface according to the information of the current transaction of the IC card.

In the embodiment of the present application, after the second interface determines the EMV L2 library matching with the IC card, which can act as the proxy of the EMV L2 library, and the middleware transmits the information of the current transaction to the second interface, the contactless process is completed with the IC card through the second interface according to the information of the current transaction of the IC card.

It should be noted that the application identifier and the information of the current transaction can be transmitted to the second interface at the same time, or can be transmitted to the second interface in stages, so that the necessary parameters and process control rights are handed over to the proxy (second interface) of the EMV L2 library. The proxy calls the matching EMV L2 interface according to the specific specification to complete the interaction processing.

As another embodiment of the present application, the middleware further includes: a set of Key-Value pairs satisfying the parameters of multiple EMV L2 libraries;
  correspondingly, the step of transmitting the information of current transaction of the IC card to the second interface, to complete the contactless process with the IC card through the second interface according to the information of the current transaction of the IC card includes:
  transmitting the information of current transaction of the IC card and the set of Key-Value pairs to the second interface, to convert the information of current transaction of the IC card into a parameter matching the interface of the EMV L2 library matching with the IC card according to the set of Key-Value pairs through the second interface.

In the embodiment of the present application, the first interface can be provided for upper-layer applications, and a second interface can be provided for different contactless EMV L2 libraries to shield the interface differences of different EMV L2 libraries. However, in practical applications, the parameters required by the kernel of each contactless EMV L2 library will also be different, therefore, the set of Key-Value pairs is necessary to be set in the middleware to meet the different requirements for parameters of different contactless EMV L2 libraries at the same time.

In the embodiment of the present application, the middleware further includes: a set of Key-Value pairs that satisfies the parameters of multiple EMV L2 libraries, then the set of Key-Value pairs needs to be also transmitted to the second interface, so that the information of the current transaction of the IC card is converted into parameters matching the interface of the EMV L2 library matched with the IC card through the second interface according to the set of the Key-Value pairs.

As another embodiment of the present application, the set of Key-Value pairs in the middleware is written and read through the Bundle component in the Android platform.

As an embodiment of the present application, if a request for adding a new EMV L2 library is received, a set of Key-Value pairs corresponding to the newly added EMV L2 library is written into the middleware through the Bundle component in the Android platform.

In the embodiment of the present application, since the middleware provides a unified first interface for upper-layer applications, and provides a unified second interface for the EMV L2 library as a proxy of the EMV L2 library. Therefore, when the EMV L2 specification is newly added, it is only necessary to implement the defined interface, completing the development of the proxy according to the corresponding contactless process specification, and modifying the corresponding code in the middle layer. At the same time, in order to ensure that the parameter requirements of the new contactless EMV L2 library can be met, the set of Key-Value pairs corresponding to the newly added EMV L2 library can also be written into the middleware through the Bundle component in the Android platform.

It should be understood that the size of the sequence numbers of the steps in the above embodiments does not mean the sequence of execution, and the execution sequence of each process should be determined by its function and internal logic, and should not constitute any limitation to the implementation process of the embodiments of the present application.

Figure 4:
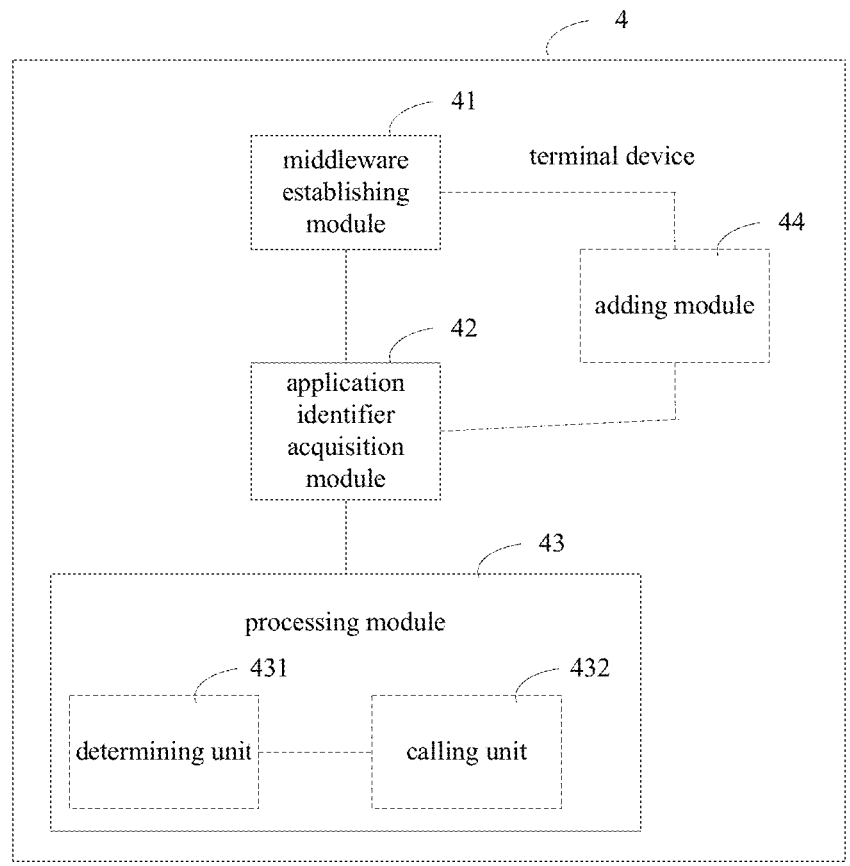
FIG. 4 is a schematic block diagram of a terminal device provided by an embodiment of the present application.

FIG. 4 is a schematic block diagram of a terminal device provided by an embodiment of the present application. For convenience of description, only parts related to the embodiment of the present application are shown.

The terminal device 4 can be a software unit, a hardware unit or a unit combining software and hardware built into the terminal device such as the cash register system and computer, or can be integrated into the terminal device such as the cash register system and computer as an independent pendant.

The terminal device 4 includes:
  a middleware establishing module 41, configured for establishing a middleware based on EMV L2, wherein the middleware provides a first interface for an upper-layer application of the terminal device to call;
  an application identifier acquisition module 42, configured for after the middleware receives a calling request for the first interface sent by the upper-layer application according to detected information of a IC card, calling an interface of an Entry library according to the calling request to obtain a return result of the Entry library, wherein the return result of the Entry library comprises an application identifier of the IC card; and
  a processing module 43, configured for determining an EMV L2 library matching the IC card based on the application identifier, and calling an interface of the EMV L2 library matching the IC card, to complete a contactless process with the IC card.

As yet another embodiment of the present application, the middleware further provides a second interface as a proxy for the EMV L2 library, so as to complete a contactless process with the IC card.

As another embodiment of the present application, the processing module 43 includes:
  a determining unit 431, configured for transmitting the application identifier to the second interface, and determining the EMV L2 library matching the IC card through the second interface.

As another embodiment of the present application, the calling request includes the information of the current transaction of the IC card;
  The processing module 43 also includes:
  a calling unit 432, configured for using the second interface as a proxy of the EMV L2 library matching the IC card, and transmitting the information of current transaction of the IC card to the second interface, to complete the contactless process with the IC card through the second interface according to the information of the current transaction of the IC card.

As another embodiment of the present application, the middleware further includes: a set of Key-Value pairs satisfying the parameters of multiple EMV L2 libraries;
  The calling unit 432 is further configured for transmitting the information of current transaction of the IC card and the set of Key-Value pairs to the second interface, to convert the information of current transaction of the IC card into a parameter matching the interface of the EMV L2 library matching with the IC card according to the set of Key-Value pairs through the second interface.

As another embodiment of the present application, the set of Key-Value pairs in the middleware is written and read through the Bundle component in the Android platform.

As another embodiment of the present application, the terminal device 4 further includes:

an adding module 44, configured for writing the set of Key-Value pairs corresponding to the newly added EMV L2 library into the middleware through the Bundle component in the Android platform, if a request for adding a new EMV L2 library is received.

Those skilled in the art can clearly understand that, for the convenience and simplicity of description, only the division of the above-mentioned functional units and modules is used as an example for illustration. In practical applications, the above-mentioned function allocation can be completed by different functional units and modules as required, that is, the internal structure of the terminal device is divided into different functional units or modules to complete all or part of the functions described above. Each functional unit and module in the embodiment may be integrated in one processing unit, or each unit may exist physically alone, or two or more units may be integrated into one unit, and the above-mentioned integrated units may adopt hardware. It can also be realized in the form of software functional units. In addition, the specific names of the functional units and modules are only for the convenience of distinguishing from each other, and are not used to limit the protection scope of the present application. For the specific working processes of the units and modules in the above-mentioned terminal equipment, reference may be made to the corresponding processes in the foregoing method embodiments, and details are not described herein again.

Figure 5:
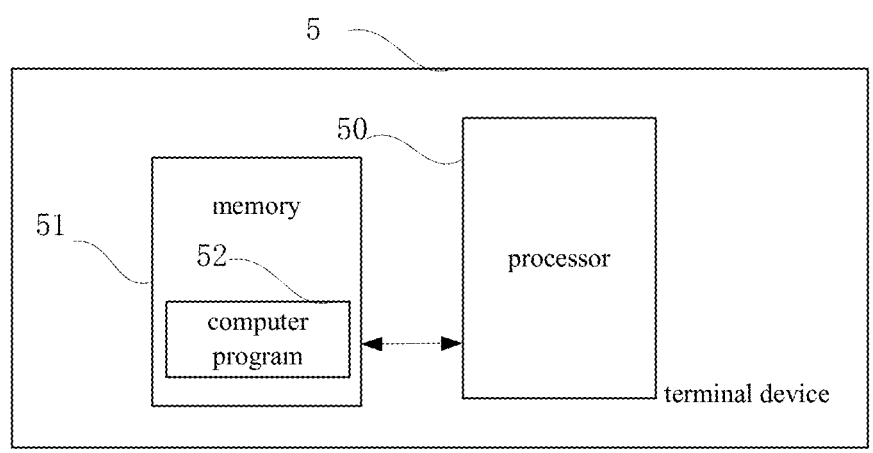
FIG. 5 is a schematic block diagram of another terminal device provided by an embodiment of the present application.

FIG. 5 is a schematic block diagram of a terminal device provided by another embodiment of the present application. As shown in FIG. 5, the terminal device 5 of the embodiment includes: one or more processors 50, a memory 51, and a computer program 52 stored in the memory 51 and executable on the processor 50. When the processor 50 executes the computer program 52, the steps in each of the foregoing embodiments of the method for implementing a middleware based on EMV are implemented, for example, steps S201 to S203 shown in FIG. 2. Alternatively, when the processor 50 executes the computer program 52, the functions of the modules/units in the above-mentioned terminal device embodiments, for example, the functions of the modules 41 to 43 shown in FIG. 4 are implemented.

Exemplarily, the computer program 52 can be divided into one or more modules/units, and the one or more modules/units are stored in the memory 51 and executed by the processor 50 to complete the present application. The one or more modules/units may be a series of computer program instruction segments capable of performing specific functions, and the instruction segments are used to describe the execution process of the computer program 52 in the terminal device 5. For example, the computer program 52 can be divided into a middleware establishing module, an application identifier acquisition module, and a processing module.

The middleware establishing module, configured for establishing a middleware based on EMV L2, wherein the middleware provides a first interface for an upper-layer application of the terminal device to call;

The application identifier acquisition module, configured for after the middleware receives a calling request for the first interface sent by the upper-layer application according to detected information of a IC card, calling an interface of an Entry library according to the calling request to obtain a return result of the Entry library, wherein the return result of the Entry library comprises an application identifier of the IC card; and The processing module, configured for determining an EMV L2 library matching the IC card based on the application identifier, and calling an interface of the EMV L2 library matching the IC card, to complete a contactless process with the IC card.

For other modules or units, reference may be made to the description in the embodiment shown in FIG. 4, and details are not described herein again.

The terminal device includes but is not limited to the processor 50 and the memory 51. It can be understood for one of ordinary skill in the art that, FIG. 5 is merely an example of the measuring terminal 8, and is not constituted as limitation to the measuring terminal 5, more or less components shown in FIG. 8 can be included, or some components or different components can be combined; for example, the terminal device for determining wellbore cross-sectional shape can also include an input and output device, a network access device, a bus, etc.

The so called processor 50 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 51 can be an internal storage unit of the terminal device 5, such as a hard disk or a memory of the terminal device 5. The memory 51 can also be an external storage device of the terminal device 5, such as a plug-in hard disk, a SMC (Smart Media Card), a SD (Secure Digital) card, a FC (Flash Card) equipped on the terminal device 5. Further, the memory 51 may include both the internal storage unit and the external storage device of the terminal device 5, either. The memory 51 is configured to store the computer programs, and other procedures and data needed by the terminal device 5 for determining wellbore cross-sectional shape. The memory 51 can also be configured to storing data that has been output or being ready to be output temporarily.

In the aforesaid embodiments, the description of each of the embodiments is emphasized respectively, regarding a part of one embodiment which isn't described or disclosed in detail, please refer to relevant descriptions in some other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for implementing a middleware based on EMV, applied to a terminal device, and the method comprising:
    establishing, on the terminal device, a middleware based on EMV L2, wherein the middleware provides a first interface for an upper-layer application of the terminal device to call and a second interface as a proxy of an EMV L2 library;
    after the middleware receives a calling request for the first interface sent by the upper-layer application of the terminal device according to detected information of a IC card, wherein the calling request comprises information of current transaction of the IC card; calling an interface of an Entry library according to the calling request to obtain an application identifier of the IC card, and wherein the application identifier is matched with pre-stored supported application identifiers; if matching is successful, the application identifier of the IC card is returned to the middleware; and
    transmitting the application identifier to the second interface, and determining the EMV L2 library matching the IC card through the second interface; and using the second interface as a proxy of the EMV L2 library matching the IC card, and transmitting the information of current transaction of the IC card to the second interface, to complete a contactless process with the IC card through the second interface according to the information of the current transaction of the IC card.

2. The method according to claim 1, wherein the middleware further comprises: a set of Key-Value pairs that satisfy parameters of multiple EMV L2 libraries;
    correspondingly, the step of transmitting the information of current transaction of the IC card to the second interface, to complete a contactless process with the IC card through the second interface according to the information of the current transaction of the IC card comprises:
    transmitting the information of current transaction of the IC card and the set of Key-Value pairs to the second interface, to convert the information of current transaction of the IC card into a parameter matching the interface of the EMV L2 library matching with the IC card according to the set of Key-Value pairs through the second interface.

3. The method according to claim 2, wherein the set of Key-Value pairs in the middleware is written and read by a Bundle component in an Android platform.

4. The method according to claim 3, wherein the method further comprises:
    if a request for adding a new EMV L2 library is received, a set of Key-Value pairs corresponding to a newly added EMV L2 library is written into the middleware through the Bundle component in the Android platform.

5. A terminal device, comprising a memory, a processor and a computer program stored in the memory and running on the processor, wherein the processor executes the computer program to implement steps of a method; and the processor is configured for executing:
    establishing, on the terminal device, a middleware based on EMV L2, wherein the middleware provides a first interface for an upper-layer application of the terminal device to call and a second interface as a proxy of an EMV L2 library;
    after the middleware receives a calling request for the first interface sent by the upper-layer application according to detected information of a IC card, wherein the calling request comprises information of current transaction of the IC card; calling an interface of an Entry library according to the calling request to obtain an application identifier of the IC card, and wherein the application identifier is matched with pre-stored supported application identifiers; if matching is successful, the application identifier of the IC card is returned to the middleware; and transmitting the application identifier to the second interface, and determining the EMV L2 library matching the IC card through the second interface; and using the second interface as a proxy of the EMV L2 library matching the IC card, and transmitting the information of current transaction of the IC card to the second interface, to complete a contactless process with the IC card through the second interface according to the information of the current transaction of the IC card.

6. A computer-readable storage medium storing a computer program, and the computer program is executed by one or more processors to implement steps of a method; and the computer program is configured for executing:

establishing, on a terminal device, a middleware based on EMV L2, wherein the middleware provides a first interface for an upper-layer application of the terminal device to call and a second interface as a proxy of an EMV L2 library;

after the middleware receives a calling request for the first interface sent by the upper-layer application according to detected information of a IC card, wherein the calling request comprises information of current transaction of the IC card; calling an interface of an Entry library according to the calling request to obtain an application identifier of the IC card, and wherein the application identifier is matched with pre-stored supported application identifiers; if matching is successful, the application identifier of the IC card is returned to the middleware; and transmitting the application identifier to the second interface, and determining the EMV L2 library matching the IC card through the second interface; and using the second interface as a proxy of the EMV L2 library matching the IC card, and transmitting the information of current transaction of the IC card to the second interface, to complete a contactless process with the IC card through the second interface according to the information of the current transaction of the IC card.

7. The terminal device according to claim 6, wherein the middleware further comprises: a set of Key-Value pairs that satisfy parameters of multiple EMV L2 libraries;

correspondingly, the step of transmitting the information of current transaction of the IC card to the second interface, to complete the contactless process with the IC card through the second interface according to the information of the current transaction of the IC card comprises:

transmitting the information of current transaction of the IC card and the set of Key-Value pairs to the second interface, to convert the information of current transaction of the IC card into a parameter matching the interface of the EMV L2 library matching with the IC card according to the set of Key-Value pairs through the second interface.

8. The terminal device according to claim 7, wherein the set of Key-Value pairs in the middleware is written and read by a Bundle component in an Android platform.

9. The terminal device according to claim 8, wherein the processor further configured for executing:

if a request for adding a new EMV L2 library is received, a set of Key-Value pairs corresponding to a newly added EMV L2 library is written into the middleware through the Bundle component in the Android platform.

* * * * *